United States Patent
Jellema et al.

(10) Patent No.: US 11,608,404 B2
(45) Date of Patent: Mar. 21, 2023

(54) BLOCK COPOLYMERS AND POLYMER MODIFIED BITUMEN THEREFROM

(71) Applicant: KRATON POLYMERS LLC, Houston, TX (US)

(72) Inventors: Erica Jellema, Amsterdam (NL); Sebastian Puchalski, Houston, TX (US); Robert Kluttz, Houston, TX (US); Rombout Hartemink, Manchester (GB)

(73) Assignee: KRATON CORPORATION, Houston, TX (US)

(*) Notice: Subject to any disclaimer, the term of this patent is extended or adjusted under 35 U.S.C. 154(b) by 45 days.

(21) Appl. No.: 17/302,984

(22) Filed: May 18, 2021

(65) Prior Publication Data
US 2021/0363284 A1    Nov. 25, 2021

Related U.S. Application Data

(60) Provisional application No. 62/704,691, filed on May 22, 2020.

(51) Int. Cl.
*C08F 293/00* (2006.01)
*C08L 95/00* (2006.01)

(52) U.S. Cl.
CPC ............ *C08F 293/00* (2013.01); *C08L 95/00* (2013.01)

(58) Field of Classification Search
CPC .. C08F 293/00; C08F 297/044; C08F 297/04; C08L 95/00; C08L 53/02; Y02A 30/30
See application file for complete search history.

(56) References Cited

U.S. PATENT DOCUMENTS

| | | | |
|---|---|---|---|
| 5,134,199 A | 7/1992 | Hattori et al. | |
| 5,795,944 A | 8/1998 | Graafland et al. | |
| 6,235,847 B1 | 5/2001 | Hoshi et al. | |
| 7,622,519 B2 | 11/2009 | Klullz et al. | |
| 2004/0048979 A1* | 3/2004 | de Jong | C08L 95/00 525/98 |
| 2009/0105376 A1* | 4/2009 | Korenstra | C08L 95/00 524/68 |
| 2009/0131558 A1* | 5/2009 | Kim | C08F 297/044 523/450 |
| 2016/0333132 A1* | 11/2016 | Shiromoto | C08L 53/02 |
| 2017/0073519 A1* | 3/2017 | Nakajima | C08L 95/00 |
| 2018/0201716 A1* | 7/2018 | Kameda | C09J 125/10 |
| 2019/0153214 A1* | 5/2019 | Shiromoto | E01C 7/265 |

FOREIGN PATENT DOCUMENTS

| | | |
|---|---|---|
| EP | 0728814 A1 | 8/1996 |
| WO | 9507307 A1 | 3/1995 |

\* cited by examiner

Primary Examiner — Ellen M McAvoy

(57) ABSTRACT

Disclosed herein are linear block copolymers of formula A-B-A' or A-B*B-A', wherein blocks A and A' are polystyrene blocks, block B is a poly(conjugated diene) block and * is a coupling agent having a vinyl content of from 10-60 mol %. The block copolymers have a polystyrene content of from 20-35 wt. %, relative to the overall weight of the block copolymer, and a molecular weight of from 200,000-300,000 g/mol. The block copolymers can be used with a wide variety of asphalt grades, and are valuable for producing homogeneous polymer modified asphalt compositions having an effective combination of performance properties, such as acceptable viscosity, good elastic response to an applied stress, and a low non-recoverable creep compliance. The combination of vinyl content and polymerization technology allows a high solution concentration during polymerization without excessive processing viscosity.

17 Claims, No Drawings

BLOCK COPOLYMERS AND POLYMER MODIFIED BITUMEN THEREFROM

RELATED APPLICATIONS

This application claims priority from U.S. Provisional Application No. 62/704,691, with a filing date of May 22, 2020, which disclosure is incorporated herein by reference.

FIELD

The present disclosure relates to block copolymers and their use for producing polymer-modified bitumen and derived asphalt compositions.

BACKGROUND

The use of bitumen in the manufacture of materials, e.g., asphalt, for highway and for industrial applications is known. Bitumen is the main hydrocarbon binder used in the field of road construction and civil engineering. To be used as a binder in these different applications, it is desirable for the bitumen to have certain mechanical properties, e.g., viscoelastic, adhesive and/or cohesive properties. The mechanical properties of the bitumen and of the binder compositions comprising the bitumen are measured by standardized tests, such as determination of the softening point $T_{sp}$, the penetrability and other rheological characteristics.

Polymer modification of bitumens has been used to improve the properties. However, there is a continuing need for enhanced binder formulations to further improve the properties of asphalt mixes, such as improved elastomeric response, decreased fatigue cracking, reduced low temperature cracking, and reduced rutting, caused by load factors, weather conditions, etc. to improve the performance of the resulting roads.

SUMMARY

In one embodiment, a linear sequential block copolymer is disclosed. The block copolymer has a formula A-B-A' or $(A-B)_n$—X—$(B-A')_m$, where A and A' are polystyrene blocks, and B is a poly(conjugated diene) block. n and m>=1, and X is a coupling agent. Block B has an average vinyl content of 10-60 mol. %. Polystyrene content of the overall polymer ranges from 20-35 wt. %. The copolymer has a molecular weight ranging from 200,000-300,000 g/mol.

In embodiments, the block copolymer has the formula $(A-B)_n$—X—$(B-A')_m$ with n and m having a value of 1, and the block copolymer further comprises up to 25 wt. % based on the total weight of the block copolymer, a second block copolymer having the structure $(A-B)_n$—X—$(B-A')_m$, with n and m having a value of >1 and <=5.

In another embodiment, a polymer-modified bitumen is disclosed. The polymer-modified asphalt comprises: (i) a linear sequential block copolymer of formula A-B-A' or $(A-B)_n$—X—$(B-A')_m$, as described above; (ii) at least one base bitumen; and (iii) optionally at least one crosslinking agent.

In another embodiment, a method for preparing a polymer-modified bitumen composition is described. The method comprises forming a mixture of the block copolymer and a bitumen; optionally adding a crosslinker; and blending at 140-220° C. to form the polymer-modified bitumen composition. The crosslinker can be based on a sulfur donor, peroxide or any other chemistry commonly used in industry to crosslink styrenic block copolymers in bitumen.

DESCRIPTION

The following terms, used in the specifications, will have the following meanings:

"Molecular weight" refers to the styrene equivalent molecular weight in g/mol of a polymer block or a block copolymer. The molecular weights can be measured with Gel Permeation Chromatography (GPC) using polystyrene calibration standards, such as is done according to ASTM 5296-19. The chromatograph is calibrated using commercially available polystyrene molecular weight standards. The molecular weight of polymers measured using GPC so calibrated are styrene equivalent molecular weights. The styrene equivalent molecular weight may be converted to true molecular weight when the styrene content of the polymer and the vinyl content of the diene segments are known. The detector can be a combination ultraviolet and refractive index detector. The molecular weights expressed herein are measured at the peak of the GPC trace, which can be converted to true molecular weights, and are commonly referred to as "peak molecular weight" ($M_p$). Unless converted to true molecular weights, as described above, the molecular weights quoted refer to the 'styrene equivalent peak molecular weights'.

"Vinyl content" of a polymer or a block copolymer refers to the amount of vinyl groups generated when a conjugated diene adds via a 1,2-mechanism, resulting in an olefinic or vinyl group, adjacent to the polymer backbone. The vinyl content can be measured by Nuclear Magnetic Resonance spectroscopy (NMR), and is generally expressed as mol % of the conjugated diene part. Vinyl content in embodiments can be tapered, present as a block or homogeneously distributed. At constant temperature, vinyl content of the polymer can be controlled by the concentration of the microstructure control agent during polymerisation. If the dosage is constant, the vinyl distribution is approximately even. If the dosage is gradually increased during the polymerization, the distribution is tapered. If the dosage is increased all at once, typically from zero to high, vinyl is distributed in blocks of low initially and high at the end.

"Coupling efficiency" (CE), expressed as % CE, is calculated from the GPC trace using the values of the wt. % of the coupled polymer and the wt % of the uncoupled polymer. The wt. % of the coupled polymer and the uncoupled polymer are determined using the output of a differential refractometer detector. The intensity of the signal at a specific elution volume is proportional to the amount of material of the molecular weight corresponding to a polystyrene standard detected at that elution volume. Thus the area under the curve spanning the MW range corresponding to coupled polymer is representative of the % wt. coupled polymer, and likewise for the uncoupled polymer. % CE is given by: 100*(wt % of coupled polymer)/(wt. % of coupled polymer+wt. % of uncoupled polymer). For example, if a coupling efficiency is 80%, then the polymer will contain 20% diblock and 80% triblock and multi-arm block.

"Polystyrene content" or PSC refers to the percent weight of polymerized styrene in a block copolymer, calculated by dividing the sum of molecular weight of all polystyrene blocks by the total molecular weight of the block copolymer. PSC can be determined using proton-NMR.

"Liquid asphalt" and "bitumen" are used interchangeably to mean both natural and manufactured forms of the substance.

Asphalt (Europe) or "Asphalt Mix" (US) refers to the mixture of aggregate fractions and bituminous binder as base material for bound layers of the road structure.

"Polymer-modified asphalt" or PMA is usually used in the US, while "Polymer-Modified Bitumen" or PMB is usually used in Europe, referring to a bituminous binder, such as a 'polymer modified bituminous' or 'polymer modified asphalt' binder.

MSCR or "Multiple Stress Creep Recovery" test, also listed as AASHTO TP70 and AASHTO MP19, refers a creep and recovery test to evaluate a binder's potential for permanent deformation, eliminating the need to run separate tests such as elastic recovery, toughness and tenacity, and force ductility to indicate sufficient polymer modification of asphalt binders. In the MSCR test with a Dynamic Shear Rheometer (DSR), 1-sec. creep load is applied to the asphalt binder sample, followed by 9 seconds of recovery, over multiple stress levels of 0.1 and 3.2 kPa at 10 cycles for each stress level.

The disclosure relates to a Linear Sequential Styrenic Block Copolymer (SBC) composition optimized for performance grade paving applications, particularly with Multiple Stress Creep Recovery (MSCR) test. The SBC may be referred herein as 'Linear Sequential Block Copolymer," as the structure is sequential even if the production method in some embodiments involves coupling with the use of a coupling agent, and the SBC composition may include some multi-arm species.

Linear Sequential Styrenic Block Copolymer (SBC): The SBC comprises a linear block copolymer having a formula of A-B-A' or $(A-B)_n$—X—$(B-A')_m$, wherein X is a coupling agent, and n and m>=1.

Blocks A and A' are vinyl aromatic blocks having different molecular weights, with styrene as a major component, and structurally related vinyl aromatic monomers as the minor component in mixtures selected from the group of o-methylstyrene, p-methyl styrene, p-tert-butyl styrene, 2,4-dimethyl styrene, α-methylstyrene, vinylnaphtalene, vinyltoluene, vinylxylene, 1,1-diphenylethylene, or combinations thereof. In certain embodiments, A and A' blocks have different molecular weight, a smaller block and a larger block, with the difference of the MW of the smaller and larger blocks is in the range of 3,000 to 8,000, or preferably 3,500 to 7,000.

In embodiments, the SBC has a PSC of 20-35 wt. %, or 23-33 wt. %, or 27-33 wt. %, or 29-33 wt. %, relative to the overall weight of the SBC.

Block B is a conjugated diene block, where the diene can be any conjugated diene. Alternatively, the conjugated diene has 4-8 carbon atoms. In embodiments, the conjugated diene is a butadiene monomer or an isoprene monomer that is substantially, or contains minor proportions, e.g., up to 10% by weight, of structurally related conjugated dienes, such as 2,3-dimethyl-1,3-butadiene, isoprene, 1,3-pentadiene, farnesene, myrcene, and 1,3-hexadiene. Alternatively, substantially pure butadiene or substantially pure isoprene can be used to prepare the conjugated diene blocks. In embodiments, the conjugated diene block comprises a mixture of butadiene and isoprene monomers. In embodiments, the conjugated diene block contains a residual coupling agent.

In embodiments, block B has a vinyl content of 20-60 mol %, or 25-55 mol %, or 35-45 mol %, or >30 mol %, or <50 mol %. It is recognized that the vinyl content is averaged, and by varying the addition of the microstructure controlling agent, products can be produced with vinyl content being tapered or blocky, and not homogeneous. In embodiments, the vinyl content is regularly distributed over the conjugated diene block, or as a gradient in the conjugated diene block, or present in distinct blocks of standard and high vinyl content, whereby standard refers to levels typically obtained when polymerizing without microstructure modifiers hence less than 20%, or typically in the range of 7-15%, while high refers to levels obtained with microstructure modifiers, ranging from >20%, e.g., 22-50%, or 25-40%, or as high as 75%. In embodiments, the vinyl content of Block B is controlled with the addition of microstructure modifiers, and/or the sequencing of the addition and controlling of temperature of the reaction.

In embodiments, the SBC has a formula of A-B-A', or $(A-B)_n$—X—$(B-A')_m$, wherein A and A' together form the polystyrene content of the block copolymer molecules, and with n and m having a value of 1. In embodiments, the SBC further comprises up to 20 wt. %, or <25 wt. %, or 3-15 wt. % of block copolymers having structure $(A-B)_n$—X—$(B-A')_m$ with n and/or m>1, or having a value of up to 5, or ranging from 2-4.

In embodiments, the SBC has a molecular weight of 200,000-300,000 g/mol, or >210,000 g/mol, or <290,000 g/mol, or in a range of 220,000-270,000 g/mol.

Preparation of the Linear Sequential SBC: The SBC can be produced via sequential polymerization or through polymerization and coupling. Polymerization can be achieved by contacting the appropriate monomers with an organoalkali metal compound in a suitable solvent, at a temperature range from −150° C.-200° C., or >−100° C., or from 0° C.-110° C., or <150° C., or at ambient.

In embodiments, the block copolymers are prepared by anionic polymerization techniques, sequentially polymerizing styrene to form a polystyrene block, then continue polymerizing by adding butadiene to form a butadiene block, and polymerizing styrene to form a third block. Sequential polymerization ensures that each polymer molecule contains a smaller and a larger styrene block if so desired, the coupling of Polystyrene-Polybutadiene A-B and A'-B di-blocks with smaller and larger styrene blocks would result in a statistical distribution of the different sized styrene blocks over the molecules. In addition, sequential polymerization minimizes the presence of residual diblock material.

In embodiments, the block copolymers are prepared via polymerization and coupling. Coupling technique gives better control of the styrene block sizes, as well as reducing the polymer solution viscosity during the polymerization process as the living polymer viscosity is dependent on the living polymer length of two diblocks due to living polymer association. The lower viscosity enables higher polymer concentrations per batch, thereby increasing run rate and lowering energy costs involved in solvent removal.

In embodiments for the preparation of SBC having different vinyl aromatic blocks, the process starts with sequentially polymerizing anionically styrene to form a polystyrene block of a single molecular weight using an organoalkali metal compound or through the addition of further organoalkali metal compound during the styrene polymerization, forming a mixture of different molecular weight styrene blocks. The polymerization continues by adding butadiene to form a portion of the targeted butadiene block, followed by the addition of a microstructure modifier and subsequent addition of the remainder of the butadiene to form the diblock for coupling or the sequential polymer before subsequent styrene addition. The butadiene polymerized before the addition of the microstructure modifier has a low vinyl content whereas the butadiene polymerized after the microstructure modifier addition forms a distinct high vinyl section in the polybutadiene block. Diblocks can be coupled to complete the linear block copolymer with distinct high and low vinyl Polybutadiene blocks.

In embodiments, the coupling agent is selected from di- and multi-functional molecules able to couple living anionic polymers, e.g., methoxysilanes, or halogenated silanes, epoxies, adipates, benzoates, carbon dioxide, dimethyldimethoxysilane, dimethyldibchlorosilane, di-ethyl-adipate, and mixtures thereof. In embodiments, the use of coupling agent with more than 2 functional groups can with the right dosing levels result in a SBC that is largely linear product such as $(A-B)_n$—X—$(B-A')_m$ with n and m having a value of 1, and with very small (<20 wt. %, or <10 wt. % having n and/or m having a value of >1).

In embodiments to enhance the vinyl content of the conjugated diene portion of the SBC, or to control the vinyl content of block B, addition of microstructure modifiers and/or the sequencing of the addition and controlling of temperature of the reaction is employed. Examples of modifiers include but are not limited to polar compounds such as ethers, amines and other Lewis bases, and dialkylethers of glycols. Most preferred modifiers are selected from dialkyl ether of ethylene glycol containing the same or different terminal alkoxy groups and optionally bearing an alkyl substituent on the ethylene radical, such as monoglyme, diglyme, diethoxyethane, 1,2-diethoxy-propane, 1-ethoxy-2,2-tert-butoxyethane, of which 1,2-diethoxypropane is most preferred.

Applications of the Styrenic Block Copolymer (SBC): The SBC in embodiments is for modifying bitumens, providing polymer-modified bitumen (PMB) having improved physical properties at the same polymer concentration (weight) as compared to other types of block copolymers as discussed further below.

Preparation of the PMB: The PMB compositions can be prepared by mixing the Linear Sequential SBC with a bitumen and other appropriate components. Any type of bitumen can be used for making the PMBs. This can be advantageous in a situation where there may be variability in the quality/composition/source of the bitumen. A variety of additives can be used in combination with the block copolymers to form the PMB composition. Examples include non-polymeric additives, non-reactive polymers, and reactive polymers. Non-polymeric additives include acid-based additives, flux oils, liquid plasticizers, hydrogen sulfide scavengers, amine scavengers, acid anhydrides, such as linear and cyclic anhydrides; a sulfur source, and combinations thereof. Examples of acid-based additives include one or more of the phosphorus acids, and polyphosphoric acid.

Flux oils encompass many types of oils used to modify asphalt and are the final products in crude oil distillation. They are non-volatile oils that are blended with asphalt to soften it. They can be aromatic, paraffinic, or naphthenic. Flux oils can also be any renewable-produced vegetable or bio-oil. Blends of two or more flux oils can also be used. Flux oils can also be recycled oils either mineral or bio-derived.

In an embodiment, the SBC and at least one base bitumen are first mixed, then optionally a sulfur-based crosslinker is added to the mixture. Optionally an acid-based additive can be introduced. The resulting mixture is blended at a temperature range of 140° C. to 220° C., or >150° C., or <200° C. to make the PMB. A high-shear milling process or a low-shear mixing process, as known in the art, can be used.

In embodiments, the PMB composition comprises 1-15 wt. %, or 1-10 wt %, or 2-6 wt. % SBC, based on the total weight of the PMB composition.

Uses of the PMB compositions: The PMBs are for use in applications including but not limited to asphalt pavement and roofing. Examples include road pavement materials for new pavements, for pavement preservation and for pavement rehabilitation, in the form of hot mix asphalt, cold mix asphalt, warm mix asphalt, emulsified bitumen based asphalt (chip seals, slurry seals, microseals, fog seals among others), bituminous crack fillers, and tack coat layers.

The PMBs are also valuable for use in roofing applications, where a combination of relatively low viscosity, low penetration and high softening point $T_{sp}$, are desired. Examples include modified bituminous membranes, self-adhesive membranes, impact resistant shingles, laminates, shingle tab adhesives, shingle body, sheets, or roll products as well as mopping asphalt or mastic asphalt applications.

Outside of paving and roofing applications, other applications include but not limited to pipe coatings, sealants, sound damping membranes, carpets or railroad constructs.

Properties of the Polymer-modified bitumen (PMB): For paving compositions, a favorable MSCR % R is observed with the PMB made using the Linear Sequential SBC.

At a given wt. % SBC in the PMB, the composition exhibits better MSCR properties as compared to the PMBs made using other types of block copolymers of the prior art, such as radial block copolymers, or linear coupled block copolymers. Alternatively, PMBs made can exhibit similar MSCR properties at a lower polymer concentration. Therefore, the PMBs have higher efficiency on the basis of the amount of polymer.

The PMB compositions have superior properties, due in part to the elastomeric modification of the asphalt. One of the parameters that gives a measure of the effectiveness of a polymer in a PMB is "% Recovery" (herein also referred to as "% R") under a given shear stress, measured using the MSCR (Multiple Stress Creep Recovery) test as per ASTM D7405 test method. The % R value is defined by Eq (1):

$$\% R = 100 * (\text{Recoverable shear strain/Peak strain}) \quad \text{Eq (1);}$$

wherein the recoverable shear strain is given by the difference between the instantaneous shear strain and the non-recoverable shear strain. The MSCR test is also a standard way to assess the rut resistance, especially at high temperatures, of an asphalt mix produced using the PMB. For comparing the effectiveness of a given PMB versus a reference bituminous material, the parameter % R may be used as described above.

This parameter can also be used to study the effect of different variables on the overall performance of the PMB, such as, the type of bitumen, curing temperature or curing time used for preparing the PMB, wt. % of the SBC in the PMB. The variability in bitumen can arise from numerous factors, such bitumen source, process used for making the bitumen, and composition (blend components) of the bitumen. When there is variability in bitumen grades, it is generally desirable to obtain a high % R value that does not vary too much with the chemical nature of the bitumen, leading to a more steady performance under realistic road/pavement conditions as well as the condition during the road's construction.

In embodiments, the PMB made, after being crosslinked, exhibits a % R improvement at 3.2 kPa and 64° C. of at least 10%, or at least 12%, or at least 15%, or at least 20%, relative to a PMB having a linear coupled block copolymer of molecular weight 173,000 g/mol, a vinyl content of 10 mol %, and a polystyrene content of 31%, measured at a polymer concentration of 3 wt. % ("Comparative SBC"), according to ASTM D7405.

The PMB made also has a higher softening point $T_{sp}$, as compared to PMBs made using other types of block copolymers. In embodiments, the PMB, after being crosslinked, has a softening point $T_{sp}$, (in degree Celsius) higher by at least 5° C. as compared to the Comparative SBC, measured at a polymer concentration of 9 wt %, according to ASTM D36 method. In embodiments, the PMB made has a $T_{sp}$, of at least 10° C. higher than a PMB having a linear sequential block copolymer having a MW of 150,000 g/mol, a vinyl content of 40%, and a polystyrene content of 30%, measured at a polymer concentration of 9 wt. %, according to ASTM D36.

Examples. The following non-limiting examples are provided to illustrate the Linear Sequential SBC and properties of the PMB made therefrom. In the examples:

"RTFO" stands for Rolling Thin Film Oven.

"DSR" means Dynamic Shear Rheometer.

"ODSR" stands for Original Dynamic Shear Rheometer and signifies testing done on unaged asphalt composition using a dynamic shear rheometer.

"MSCR" means Multiple Stress Creep and Recovery. In MSCR testing, the parameter % R means the percentage of recoverable strain, which is used to evaluate the elastic recovery of a polymer modified bitumen.

"Jnr" means non-recoverable creep compliance

"BBR m average" means average m-value measured using Bending Beam Rheometry.

"BBR S average" means average S-value measured using Bending Beam Rheometry.

Delta Tc is given by the numerical difference between the low continuous grade temperature determined from the Bending Beam Rheometer (BBR) stiffness criteria (the temperature where stiffness, S, equals 300 MPa) and the low continuous grade temperature determined from the BBR m-value (the temperature where m equals 0.300).

$G^* \cdot \sin(\delta)$ indicates the SuperPave fatigue parameter.

"PAV" stands for Pressure Aging Vessel, which is used to simulate long-term aging of asphalt binders.

Example to prepared C260-2 Block Copolymer: 34.5 kg styrene was added to 1032 kg of cyclohexane at 40-50° C. after which 0.88 kg of 12% sec-butyl lithium solution was added. The reaction was completed after 39 minutes. Hereafter, 169 kg of butadiene was added in 58 minutes. The polymerization was allowed to proceed for 77 minutes. Thereafter, the second portion of 34.5 kg styrene was added in 10 minutes. The polymerization was allowed to proceed for 52 minutes then 63 grams of methanol was added to terminate the polymerization. After cooling down the reaction mixture, 0.2% phenolic antioxidant by weight on polymer was added for stabilization. Product C260-2 was isolated by steam stripping to give white crumbs.

Examples Block Copolymers C260-8 and C275-1: These SBCs have the structure ABA', with the difference in MWs of A and A' blocks of 5,300 g/mol and 5,100 g/mol respectively. These were made via same procedure as above with the diethoxypropane being added after styrene polymerization but before the addition of butadiene. Quantities and reaction conditions are set out in Table 1.

TABLE 1

| Polymer | C260-2 | C260-8 | C275-1 |
|---|---|---|---|
| Styrene (kg) | 34.5 | 34.5 | 30 |
| Cyclohexane (kg) | 1032 | 1032 | 1032 |
| Sec-butyl lithium solution (kg) | 0.88 | 0.88 | 0.77 |
| Reaction time (min) | 39 | 64 | 63 |
| Diethoxypropane (g) | 0 | 204 | 204 |
| Butadiene (kg) | 169 | 169 | 179 |
| Reaction time (min) | 77 | 101 | 76 |
| Styrene (kg) | 34.5 | 34.5 | 30 |
| Reaction time (min) | 52 | 27 | 30 |
| Methanol (g) | 63 | 63 | 54 |

In addition to the above SBCs, the following block copolymers (with characteristics as in Table 2) were also used. These polymers have similar MW for the polystyrene blocks.

U-119-X is a linear sequential block copolymer.

U-1101 is a linear triblock copolymer.

C246-8 is a radial block copolymer.

U-1184 is a branched triblock (radial) copolymer.

TABLE 2

| Polymer example | Type | PS (%) | C.E. % | MW (×1000 g/mol) | Vinyl content, % |
|---|---|---|---|---|---|
| C260-2 | Linear sequential | 28 | 100 | 225 | 11 |
| C260-8 | Linear sequential | 29 | 100 | 233 | 41 |
| C275-1 | Linear sequential | 26 | 100 | 268 | 41 |
| U-119-X | Linear sequential | 30 | 100 | 150 | 40 |
| U-1101 | Linear triblock | 31 | 83 | 173 | 10 |
| C246-8 | Radial | 30 | 76 | 395 | 42 |
| U-1184 | Radial | 30 | 84 | 420 | 10 |

*CE—coupling efficiency; PS—polystyrene content; MW Molecular weight×1000 g/mol.

Example to Prepare Polymer Modified Bitumen: In the examples, each blend was made by mixing together 2.5 wt. % of a milled form of the block copolymer and 97.5 wt. % of a bitumen in low shear mode at 180° C. for 1 hour under a nitrogen blanket. After 1 hour elemental sulfur was added at 0.1 wt % of the combination of bitumen and the block polymer and blending continued for 6 more hours at 180° C. The PMB blends were sampled for storage stability, RTFO DSR and MSCR testing at 64° C. The results are shown in Table 3. The quantities "MSCR % R, 3.2 kPa, 64° C. top" and "% R, 3.2 kPa, 64° C. bottom" refers to the difference in % R between the top and bottom layers of the PMB blend, measured according to ASTM D7173. It is desirable for the PMB blend to have a low viscosity at 135° C., a low separation (% R) Top & Bottom layers value (negative or close to 0), a high RTFO DSR, and a high RTFO MSCR.

TABLE 3

| Polymer | U-1101 | U-119-X | C246-8 | C260-2 | C260-8 | C275-1 |
|---|---|---|---|---|---|---|
| PMB example | 12 | 11 | 13 | 8 | 9 | 10 |
| Viscosity 135° C. [Pa · s] | 1.08 | 1.06 | 1.69 | 1.37 | 1.51 | 1.57 |
| MSCR, % R, 3.2 kPa, 64° C. top | 51 | 39 | 49 | 62 | 79 | 81 |

TABLE 3-continued

| Polymer | U-1101 | U-119-X | C246-8 | C260-2 | C260-8 | C275-1 |
|---|---|---|---|---|---|---|
| MSCR, % R, 3.2 kPa, 64° C. bottom | 49 | 40 | 47 | 53 | 81 | 82 |
| Separation (% R) Top & Bottom layers | 1.8 | −0.3 | 1.6 | 8.6 | −2.5 | −1.2 |
| RTFO DSR G*/sin(δ) [kPa] 64° C. | 6.36 | 8.28 | 8.46 | 6.91 | 6.36 | 9.58 |
| RTFO MSCR 64° C. Jnr, 0.1 kPa | 0.423 | 0.34 | 0.193 | 0.197 | 0.124 | 0.195 |
| RTFO MSCR 64° C. Jnr, 3.2 kPa | 0.594 | 0.445 | 0.307 | 0.3 | 0.209 | 0.292 |
| RTFO MSCR 64° C. % R, 3.2 kPa | 49.4 | 50.2 | 60.6 | 69.8 | 71.9 | 59.9 |

All PMB samples had acceptable viscosity of less than 3.0 Pa·s at 135° C. PMB samples 9 and 10 showed no phase separation upon storage. Sample 8 showed some phase separation after storage. All PMB samples showed high RTFO DSR properties. PMB sample 9 showed the best combination of viscosity, phase stability, and MSCR properties. PMBs having high MSCR properties (superior elastomeric properties) can be valuable in paving applications. Use of PMBs having low viscosity, or a low content of the block copolymer, can lead to overall better performing roads and material cost savings.

The block copolymer C260-8, U-119-X, U-1101 and U-1184 were compared for their suitability in obtaining PMB formulations that can pass the PG64E-22/PG76-22 performance grade parameters. For each polymer sample, 2 PMB samples were prepared, one having 3 wt. % and the other having 2 wt. % polymer. In each case, the PMB formulation was made by mixing together indicated wt. % of a milled form of the polymer, and bitumen in low shear mode at 180° C. for 1 hour under a nitrogen blanket. After 1 hour, 0.1 wt % elemental sulfur was added and blending continued for 8 hours at 180° C. Storage stability is given by the difference in % R between the top and bottom layers of the PMB blend, measured according to ASTM D7173.

The interpolated polymer dosage based on the criteria: RTFO G*/sin(δ), 76° C.=2.2 kPa, and Jnr, 3.2 kPa, 64° C.<0.5, is shown in Table 5.

The data indicates that the PMB compositions based on the block copolymer of SBC block copolymer C260-8 have better properties than those made using block copolymers U-119-X, U-1101 and U-1184. For example, the PMB composition 14 is more efficient than PMB compositions 16, 18 and 20, on the basis of wt. % of the block copolymer for achieving a favorable MSCR % R.

TABLE 4

| Polymer | C260-8 | C260-8 | U-1101 | U-1101 | U-1184 | U-1184 | U-119-X | U-119-X |
|---|---|---|---|---|---|---|---|---|
| PMB | 14 | 15 | 16 | 17 | 18 | 19 | 20 | 21 |
| Polymer wt. % | 3 | 2 | 3 | 2 | 3 | 2 | 3 | 2 |
| Viscosity 135° C. [Pa·s] | 1.90 | 1.16 | 1.29 | 0.919 | 1.54 | 1.11 | 1.19 | 0.843 |
| Storage Stability, Top (MSCR, % R, 3.2 kPa) | 90.0 | 56.1 | 67.2 | 27.1 | 53.9 | 46.1 | N/A | N/A |
| Storage Stability, Bottom (MSCR, % R, 3.2 kPa) | 91.1 | 57.2 | 68.0 | 26.6 | 65.3 | 46.0 | N/A | N/A |
| Separation (% R) Top & Bottom layers | −1.1 | −1.1 | −0.8 | 0.5 | −11.4 | 0.1 | N/A | N/A |
| Original residue DSR G*/sin(δ) [kPa], 76° C. | 1.69 | 1.22 | 1.39 | 1.02 | 1.45 | 1.08 | 1.37 | 0.890 |
| RTFO residue DSR G*/sin(δ) [kPa], 76° C. | 3.31 | 1.97 | 2.51 | 1.53 | 2.66 | 1.88 | 2.77 | 1.90 |
| RTFO residue MSCR Jnr, 3.2 kPa, 64° C. | 0.127 | 0.501 | 0.305 | 0.747 | 0.276 | 0.630 | 0.194 | 0.683 |
| RTFO residue MSCR % R, 3.2 kPa, 64° C. | 77.8 | 50.3 | 59.9 | 43.7 | 62.3 | 40.4 | 70.4 | 33.7 |
| RTFO residue MSCR Jnr, 3.2 kPa, 76° C. | 0.767 | 3.23 | 2.69 | 5.83 | 1.90 | 3.77 | 2.41 | 4.88 |
| RTFO residue MSCR % R, 3.2 kPa, 76° C. | 61.5 | 22.9 | 20.7 | 6.5 | 34.3 | 17.5 | 20.3 | 4.8 |

TABLE 5

Interpolated polymer dosage based on the criteria: RTFO G*/sin(δ), 76° C. = 2.2 kPa, and Jnr, 3.2 kPa, 64° C. < 0.5.

| Polymer | C260-8 | U-119-X | U-1184 | U-1101 |
|---|---|---|---|---|
| Wt % polymer | 2.17 | 2.38 | 2.41 | 2.68 |
| Viscosity 135° C. [Pa · s] | 1.28 | 0.975 | 1.29 | 1.16 |
| Original residue G*/sin(δ), 76° C. | 1.30 | 1.07 | 1.23 | 1.27 |
| RTFO residue G*/sin(δ), 76° C. | 2.20 | 2.23 | 2.20 | 2.20 |
| RTFO residue MSCR Jnr, 3.2 kPa, 64° C. | 0.376 | 0.497 | 0.485 | 0.469 |
| RTFO residue MSCR % R, 3.2 kPa, 64° C. | 59.6 | 47.6 | 49.4 | 53.9 |
| Low temperature PG grade | −25.5 | −23.8 | −25.2 | −26.2 |

From the interpolated data, it can be seen the PMB obtained using block copolymer C260-8 showed the most favorable overall performance at the lowest wt. % content in asphalt, as compared to polymer example U-119-X, the next best polymer.

The block copolymer C260-8 forms PMBs having superior MSCR properties even when the bitumen binder component is varied. The block copolymer C260-8 and U-1101 were chosen for this study. For each polymer sample, 2 PMB samples were prepared, one having 3 wt. % and the other having 2 wt. % of the polymer, using the same procedure described earlier. Interpolated polymer dosage based on the criteria: RTFO G*/sin(δ), 76° C.=2.2 kPa, and Jnr, 3.2 kPa, 64° C.<0.5, were determined. Data are shown in Tables 6 and 7.

TABLE 6

| Polymer | C260-8 | C260-8 | U-1101 | U-1101 |
|---|---|---|---|---|
| PMB Ex | 22 | 23 | 24 | 25 |
| Polymer wt. % | 3 | 2 | 3 | 2 |
| Viscosity [Pa · s] | 1.90 | 1.16 | 1.29 | 0.919 |
| Original residue DSR G*/sin(δ) [kPa], 76° C. | 1.69 | 1.22 | 1.39 | 1.02 |
| RTFO residue DSR G*/sin(δ) [kPa], 76° C. | 3.31 | 1.97 | 2.51 | 1.53 |
| RTFO residue MSCR Jnr, 3.2 kPa, 64° C. | 0.127 | 0.501 | 0.305 | 0.747 |
| RTFO residue MSCR % R, 3.2 kPa, 64° C. | 77.8 | 50.3 | 59.9 | 43.7 |
| RTFO residue MSCR Jnr, 3.2 kPa, 76° C. | 0.767 | 3.23 | 2.69 | 5.83 |
| RTFO residue MSCR % R, 3.2 kPa, 76° C. | 61.5 | 22.9 | 20.7 | 6.5 |

TABLE 7

Interpolated polymer dosage based on Jnr, 3.2 kPa, 64° C. < 0.5 to target PG64E-28 grade.

| Polymer example | C260-8 | U-1101 |
|---|---|---|
| Wt % polymer | 2.17 | 2.81 |
| Viscosity 135° C. [Pa · s] | 0.852 | 0.830 |
| RTFO residue G*/sin(δ), 76° C. | 4.21 | 4.58 |
| RTFO residue MSCR % R, 3.2 kPa, 64° C. | 65.9 | 63.2 |

Table 8 shows the $T_{sp}$, Ring and Ball of PMBs made using polymers C260-8, U-1101 and U-1184. At a given wt. % of the polymer, the PMB made using polymer C260-8 had the highest Ring and Ball $T_{sp}$. PMBs such as that made from Linear Sequential block copolymer C260-8 are valuable in paving applications having a high Ring and Ball $T_{sp}$.

TABLE 8

| Polymer | C260-8 | | U-1101 | | U-119-X | |
|---|---|---|---|---|---|---|
| wt % SBS | 3 | 2 | 3 | 2 | 3 | 2 |
| Softening Point [° C.] | 67.8 | 60.6 | 59.0 | 57.0 | 58.8 | 55.2 |

Table 8 also shows that at a given wt. % of the polymer, PMB based on polymer C260-8, besides showing a % R improvement (cf: Table 4), also has a higher $T_{sp}$ than PMB samples based on block copolymers U-1101 and U-119-X. Thus, PMB based on block copolymer C260-8 has high efficiency per unit weight of the polymer.

The comparative performance of block copolymers C260-8, U-119-X, and U-1101 was also studied as a function of different bitumen grades, A, B, and C. All blends were made under conditions listed in Table 9.

TABLE 9

| Preparation of the Formulations. | |
|---|---|
| Polymer wt. % | 9 |
| Blend Size | Quart (approximately 1 liter) |
| Nitrogen blanket used? | no |
| High Shear used? | yes |
| High Shear Time | 20 min |
| High Shear Temperature | 190-219° C. |
| Low Shear Used | No |
| Sample conditioning method prior to measuring properties | Placed for 30 min in oven @190° C. before sampling |

Properties of PMB 26-37 made from polymers C260-8, U-119-X, and U-1101 are shown in Table 10. For different bitumen grades, the PMBs made from polymer C260-8 have satisfactory penetration $T_{sp}$, while yielding a relative low viscosity. Phase separation % was measured as follows. Freshly formulated PMB is poured into a 1-L metal can. The can is then covered with a lid and placed in an over at 160° C. for 5 days. Then the sample is removed and rapidly cooled to room temperature for the PMB sample to solidify. Then the bottom of the metal can is removed and the sides of the can are heated until the PMB sample inside the can slides out. The PMB sample is probed from bottom to top with a needle to detect if phase separation of polymer in the sample has occurred (in a phase separated sample, the polymer floats towards the top of the sample markedly changing the physical nature of the top and bottom portions). Sample is then sliced with a hot knife at the height separating the polymer-rich and polymer-deprived parts. Polymer-rich part of the sample is weighed and the weight is divided by the total weight of the sample and converted to percentage. 100% polymer rich indicates that the polymer remained fully dispersed throughout the sample. 50% phase separation indicates that the polymer rich phase made up 50% weight of the total sample after the test has been completed. 100% polymer rich is the desired test outcome.

TABLE 10

| | Polymer | C260-8 | U-119-X | U-1101 |
|---|---|---|---|---|
| Asphalt binder A | PMB Example | 26 | 27 | 29 |
| | Softening Point [° C.] | 107.5 | 89.5 | N/A |
| | Penetration, 25° C. [dmm] | 73 | 78 | N/A |
| | Viscosity at 176.7° C., 14.88 1/s shear rate [Pa · s] | 0.488 | 0.206 | N/A |
| | Phase Separation (wt % polymer rich phase) | 100% | 100% | N/A |

TABLE 10-continued

| | Polymer | C260-8 | U-119-X | U-1101 |
|---|---|---|---|---|
| Asphalt binder B | PMB Example | 30 | 31 | 33 |
| | Softening Point [° C.] | 116.0 | 98.5 | 103.5 |
| | Penetration, 25° C. [dmm] | 40 | 39 | 37 |
| | Viscosity at 176.7° C., 14.88 1/s shear rate [Pa · s] | 0.650 | 0.259 | 0.378 |
| | Phase Separation (wt % polymer rich phase) | 87% | 100% | 100% |
| Asphalt binder C | PMB Example | 34 | 35 | 37 |
| | Softening Point [° C.] | 116.5 | 100.0 | N/A |
| | Penetration, 25° C. [dmm] | 36 | 39 | N/A |
| | Viscosity at 176.7° C., 14.88 1/s shear rate [Pa · s] | 1.53 | 0.881 | N/A |
| | Phase Separation (wt % polymer rich phase) | 47% | 46% | N/A |

The data shows that with comparatively equal penetration for all three blends and relatively low viscosity, the PMB of example 26 exhibited the highest $T_{sp}$ leading to the best overall performance. The PMB composition 26 has a unique balance of $T_{sp}$, penetration, and viscosity.

Although the terms "comprising" and "including" have been used herein to describe various aspects, the terms "consisting essentially of" and "consisting of" can be used in place of "comprising" and "including" to provide for more specific aspects of the disclosure and are also disclosed.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

Unless otherwise specified, the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A polymer modified bitumen composition comprising:
   a block copolymer in an amount of 1 to 25 wt. % relative to the overall weight of the composition;
   at least a bitumen;
   optionally at least one crosslinking agent; and
   optionally additional additives;
   wherein the block copolymer has a formula of A-B-A' or (A-B)n-X—(B-A')m,
   wherein:
   A and A' are vinyl aromatic blocks having different molecular weights, A and A' have different molecular weights, with the molecular weight difference ranging from 3,000 to 8,000 g/mol,
   B is a conjugated diene block,
   B has an average vinyl content ranging from 20-60 mol %,
   n and m>=1, and X is a coupling agent;
   wherein
   the block copolymer has a polystyrene content of 20-35 wt. %, relative to the overall weight of the block copolymer, and
   the block copolymer has a molecular weight of 200,000-300,000 g/mol
   wherein a polymer modified bitumen composition containing 3 wt. % of the block copolymer has a Multiple Stress Creep Recovery, % R, of >=59% at 3.2 kPa, 64° C., and a Multiple Stress Creep Recovery Jnr of <0.3 $kPa^{-1}$ at 3.2 kPa, 64° C.

2. The polymer modified bitumen composition of claim 1, wherein the composition is used in an asphalt pavement product or an asphalt roofing product.

3. The polymer modified bitumen composition of claim 1, wherein the composition is used in new pavements, pavement preservation, pavement rehabilitation, hot mix asphalt, cold mix asphalt, warm mix asphalt, and emulsified bitumen based asphalt.

4. The polymer modified bitumen composition of claim 1, wherein the composition is used in a modified bitumen membrane, self-adhesive membrane, impact resistant shingle, laminate, shingle tab adhesive, shingle body, sheet, roll, pipe coating, sealant, sound damping membrane, carpet, railroad construct, crack filler, chip seal, and micro surfacing.

5. The polymer modified bitumen composition of claim 1, wherein the block copolymer has the formula $(A-B)_n$—X—$(B-A')_m$ with n and m having a value of 1.

6. The polymer modified bitumen composition of claim 5, wherein the block copolymer further comprises up to 25 wt. % based on the total weight of the block copolymer, a second block copolymer having the structure $(A-B)_n$—X—$(B-A')_m$, with n and m having a value of >1 and <=5.

7. The polymer modified bitumen composition of claim 1, wherein the block copolymer has a molecular weight of 220,000-270,000 g/mol.

8. The polymer modified bitumen composition of claim 1, wherein block B has a vinyl content of 25-55 mol %.

9. The polymer modified bitumen composition of claim 1, wherein the vinyl is distributed evenly over the conjugated diene block B.

10. The polymer modified bitumen composition of claim 1, wherein the vinyl is distributed with a gradient over the conjugated diene block B.

11. The polymer modified bitumen composition of claim 1, wherein the vinyl is distributed in one or more distinct blocks with low and high vinyl in the conjugated diene block B.

12. The polymer modified bitumen composition of claim 1, wherein the block copolymer is produced by any of sequential anionic polymerization, or sequential anionic polymerization followed by coupling.

13. The polymer modified bitumen composition of claim 12, wherein the block copolymer has a formula A-B-A', and wherein the block copolymer is produced by sequential anionic polymerization.

14. The polymer modified bitumen composition of claim 12, wherein the block copolymer has a formula $(A-B)_n-X-(B-A')_m$, and wherein the block copolymer is produced by sequential anionic polymerization followed by coupling with a coupling agent.

15. The polymer modified bitumen composition of claim 14, wherein the coupling agent is selected from the group of methoxysilanes, halogenated silanes, epoxies, adipates, benzoates, carbon dioxide, dimethyldimethoxysilane, dimethyldibchlorosilane, di-ethyl-adipate, and mixtures thereof.

16. The polymer modified bitumen composition of claim 12, wherein at least a microstructure modifier is added to the polymerization process to control the vinyl content of block B.

17. The polymer modified bitumen composition of claim 16, wherein the microstructure modifier is selected from ethers, amines, dialkylethers of glycols, and mixtures thereof.

* * * * *